UNITED STATES PATENT OFFICE.

RICHARD PORATH, OF PYRITZ, GERMANY.

PROCESS OF TREATING THE ROOT OF CHICORY.

1,022,047.     Specification of Letters Patent.     Patented Apr. 2, 1912.

No Drawing.     Application filed April 25, 1911. Serial No. 623,298.

*To all whom it may concern:*

Be it known that I, RICHARD PORATH, residing at Pyritz, Germany, have invented certain new and useful Improvements in Processes of Treating the Root of Chicory, of which the following is a specification.

This invention relates to an improved process of treating the roots of chicory for the production of a mild and agreeable coffee substitute.

As is well known, a substitute for coffee is prepared from the roots of chicory by cutting the raw chicory roots into pieces, drying the pieces in the kiln in order that they can be preserved in stock, and subsequently making the substitute for coffee from the dried pieces by roasting and grinding them. In this known process a part of the substances contained in the raw chicory root is completely lost, whereas other substances are materially changed in their nature by the drying and roasting process. These last substances are present in the final product; and impart a bitter pungent taste to the coffee substitute which is very objectionable to many persons.

Now the primary object of this invention is to provide a process which enables not only a coffee substitute of a quality at least equal to that of substitutes heretofore obtained from the chicory roots without the objectionable pungent taste, but by which also a large number of valuable by-products, particularly the bitter substances and albumins in the chicory root, a portion of the sugar and generally all the substances which are dissolved in the sap of the chicory-root can be utilized.

This process consists in first grinding the raw chicory-roots into pulp, or cutting it into chips or reducing it into small pieces in any other manner. From the mass thus obtained, the sap or juice is removed either at ordinary or artificially increased temperature and by means of suitable pressure. The remaining pulp is then dried and in this manner rendered capable of being kept in stock. The coffee-substitute is then made out of this dried pulp by roasting and grinding it. The sap or juice obtained according to this process is then subjected to further chemical and fermentation-treatment. From the substances dissolved in the sap alcohol and yeast are obtained by fermentation and distillation while the bitter substances and albumins are obtained from the remaining wash. It is to be noted that this juice may also be employed directly as an admixture to coffee.

The described new process can also be employed for working up dried chicory-chips. After these have been ground, water or another liquid is added to them, the mixture is left to stand for some time and then it is treated according to the above described process. The resultant product is a coffee-substitute of mild, agreeable taste which is preferred owing to the elimination of the objectionable by-taste of the chicory coffee-substitute heretofore made.

I claim:

The hereindescribed process of treating chicory roots, which consists in reducing raw chicory roots to a pulp, separating the sap or juice from the pulp, drying the remaining pulp, and then roasting and grinding the same.

In testimony whereof I affix my signature in presence of two witnesses.

RICHARD PORATH.

Witnesses:
    WOLDEMAR HAUPT,
    HENRY HASPER.

Copies of this patent may be obtained for five cents each, by addressing the "Commissioner of Patents, Washington, D. C."